United States Patent Office 3,646,123
Patented Feb. 29, 1972

3,646,123
PROCESS FOR THE CONTINUOUS OXIDATION OF METHYLBENZENE HYDROCARBONS BY NITROGEN DIOXIDE
William D. Vanderwerff, West Chester, Pa., assignor to Sun Oil Company, Philadelphia, Pa.
No Drawing. Filed Aug. 12, 1969, Ser. No. 849,496
Int. Cl. C07c 63/26
U.S. Cl. 260—524 N                    12 Claims

ABSTRACT OF THE DISCLOSURE

A continuous process for the oxidation of methyl-benzene hydrocarbons to benzenecarboxylic acids carried out at atmospheric pressure in the presence of an aromatic solvent and nitrogen dioxide.

This invention relates to a continuous process for the oxidation of methylbenzenes, and particularly to the formation of dicarboxylic acids from dimethylbenzenes.

In recent years, a great deal of interest has developed in the chemical industry in the production of benzenecarboxylic acids and esters thereof. Particularly, a substantial portion of such interest is aimed toward the production of benzenedicarboxylic acids, such as terephthalic acid, since it has been found that when such acids are esterified, the resulting esters and their polymers are extremely useful in the production of valuable synthetic fibers. As such, a great deal of effort has been expended to develop commercially acceptable processes for the production of said acids from such raw materials as alkylaromatcis, monocarboxylic acids, and the like.

Heretofore, numerous U.S. patents have issued relating to the production of aromatic carboxylic acids with stress placed on the oxidation of the reactant raw materials. U.S. Pat. 2,766,281 relates to the preparation of phthalic acids by the oxidation of the methyl groups of xylenes in a two stage process by the very slow addition of nitric acid under very controlled conditions. The reaction is carried out in an organic solvent medium. U.S. Pat. 2,636,899 relates to the preparation of terephthalic acid from xylene while also employing nitric acid as the oxidation agent, however here the patentee introduces dilute nitric acid and carries out the reaction under relatively high pressure conditions.

Considerable effort has also been expended to employ nitrogen dioxide or other oxides of nitrogen as the oxidizing agents, however for the most part this has entailed the use of oxygen or a catalyst in conjunction therewith. For example, U.S. Pat. 2,839,575 employs nitrogen dioxide or other oxides of nitrogen with either a molecular oxygen-containing gas or an oxidation catalyst for the oxidation of alkyl-substituted aromatic monocarboxylic acids. When the nitrogen compound was used individually, nitrogenous intermediate products were formed. Also, in U.S. Pat. 3,405,171 alkylnaphthalenes were oxidized to carboxylic acids in the presence of nitrogen dioxide and a selenium catalyst.

Now, it has been discovered in accordance with the instant invention, that benzenecarboxylic acids of high purity can be continuously prepared by the oxidation of methylbenzene hydrocarbons in the presence of nitrogen dioxide and an aromatic solvent. No catalyst is employed. The process is further limited to be applicable only to those methylbenzene hydrocarbons whose desired oxidation product is less soluble in the solvent employed than the substrate, i.e. the initial methylbenzene reactant, and any intermediate oxidation products. Such limitation lends to easy separation of the product from reactants and intermediates and enables the instant process to be carried out continuously. The process is, of course, applicable to batch operation. An example of the operable methylbenzenes when employing the applicable solvents, as hereinafter discussed, and a preferred group of compounds is the xylenes, wherein the most preferred compound is p-xylene. The term "methylbenzene hydrocarbon" as employed herein relates to those benzene ring compounds having attached thereto only methyl radicals, wherein form 1 to 6 methyl radicals can be attached to the benzene.

The reaction is conducted at temperatures in the range of about 130° to 180° C. and at atmospheric pressure. Preferably, the reaction is conducted at temperatures in the range of about 130° to 160° C., the lower temperatures being more conducive to a higher purity product. There is no critical limitation placed on the feed rate of the methylbenzenes, however for a superior continuous process the feed rate should equal the rate of formation of the carboxylic acid thus enabling one to maintain a steady state in the reactor.

As aforenoted, the oxidation is carried out in the presence of an aromatic solvent, which is preferably halogenated. The solvent must be inert to the nitrogen dioxide and it must be a good solvent for the methylbenzene hydrocarbon and the intermediate oxidation products. As such, the most suitable solvents are the chlorobenzenes. A preferred solvent is o-dichlorobenzene, since it has proved to be quite stable to the nitrogen dioxide. No limitation is placed on the amount of solvent employed in the process, however it should be used in an amount sufficient to dissolve all of the intermediate products and preferably an amount in excess thereof.

As a further limitation to the operability of the process, any water formed during the oxidation reaction must be removed since the retention of such water in the reaction zone would tend to create undesirable side reactions and negate the effectiveness of the nitrogen dioxide. The water can be removed by any means well known in the art with no criticality placed thereon, such as by distillation, condensation of vapors outside the reaction zone, or dehydration agents.

EXAMPLE I

As a specific, but non-limiting example of the instant invention, a three-liter cylindrical reactor was equipped with stainless steel baffles and a high-speed twin-turbine stirrer and designed to allow the continuous removal of a drag stream so as to remove the product by filtration thereof and for return of the filtrate to the system, and to allow for the continuous introduction of methylbenzene reactants and removal of water at room temperature. The reactor was charged with 1200 ml. of o-dichlorobenzene and 106 g. of p-xylene. Thereafter, the reactor was heated to 160° C. and substantially pure $NO_2$ was blown through the vigorously stirred mixture for a period of 24 hours during which time 312 grams of p-xylene was added to the system. Throughout the reaction period, a drag stream was removed from the reactor, filtered hot to remove the terephthalic acid product which is insoluble in the o-dichlorobenzene and the filtrate containing unreacted p-xylene and intermediates was returned to the system. Also, 144 grams of water were formed which were removed with the assistance of a Dean-Stark tube. The reaction yielded 355 grams of 99.4% pure terephthalic acid.

While the particular compositions and methods of application described herein are well adapted to meet the objects of the present invention, various modifications or changes may be resorted to without departing from the scope of the invention as defined in the claims.

I claim:

1. A non-catalytic process for oxidation of a methylbenzene hydrocarbon to a benzenecarboxylic acid which comprises contacting said methylbenzene and nitrogen dioxide in a halogenated aromatic solvent at a temperature of from about 130° to 180° C. and at atmospheric pressure, said halogenated aromatic solvent being present in an amount sufficient to dissolve any product intermediate to formation of said benzenecarboxylic acids, and during said process, removing water formed during the reaction.

2. A process as described in claim 1 wherein the reaction is carried out at a temperature in the range of 130° to 160° C.

3. A process as described in claim 2 wherein the solvent is o-dichlorobenzene.

4. A process as described in claim 3 wherein the methylbenzene hydrocarbon is a xylene.

5. A process as described in claim 4 wherein the xylene is p-xylene.

6. A process as described in claim 1 wherein the methylbenzene hydrocarbon is a xylene.

7. A non-catalytic process for the continuous preparation of benzenecarboxylic acids which comprises continuously contacting a methylbenzene hydrocarbon and nitrogen dioxide in a halogenated aromatic solvent at a temperature of from about 130° to 180° C. and at atmospheric pressure, said methylbenzene being added at the rate at which benzenecarboxylic acid is formed, removing water of formation, filtering a product stream to remove insoluble product, and returning the filtrate to the reaction process.

8. A process as described in claim 7 wherein the reaction is carried out at a temperature in the range of 130° to 160° C.

9. A process as described in claim 8 wherein the solvent is o-dichlorobenzene.

10. A process as described in claim 9 wherein the methylbenzene hydrocarbon is a xylene.

11. A process as described in claim 10 wherein the xylene is p-xylene.

12. A process as described in claim 7 wherein the methylbenzene hydrocarbon is a xylene.

References Cited
UNITED STATES PATENTS

| | | | |
|---|---|---|---|
| 2,766,281 | 10/1956 | Zienty et al. | 260—524 |
| 2,821,534 | 1/1958 | Alexander | 260—524 |
| 2,839,575 | 6/1958 | Fetterly | 260—524 |
| 2,860,162 | 11/1958 | Thuresson | 260—524 |
| 3,328,461 | 6/1967 | Argabright et al. | 260—524 |

LORRAINE A. WEINBERGER, Primary Examiner

R. S. WEISSBERG, Assistant Examiner